UNITED STATES PATENT OFFICE.

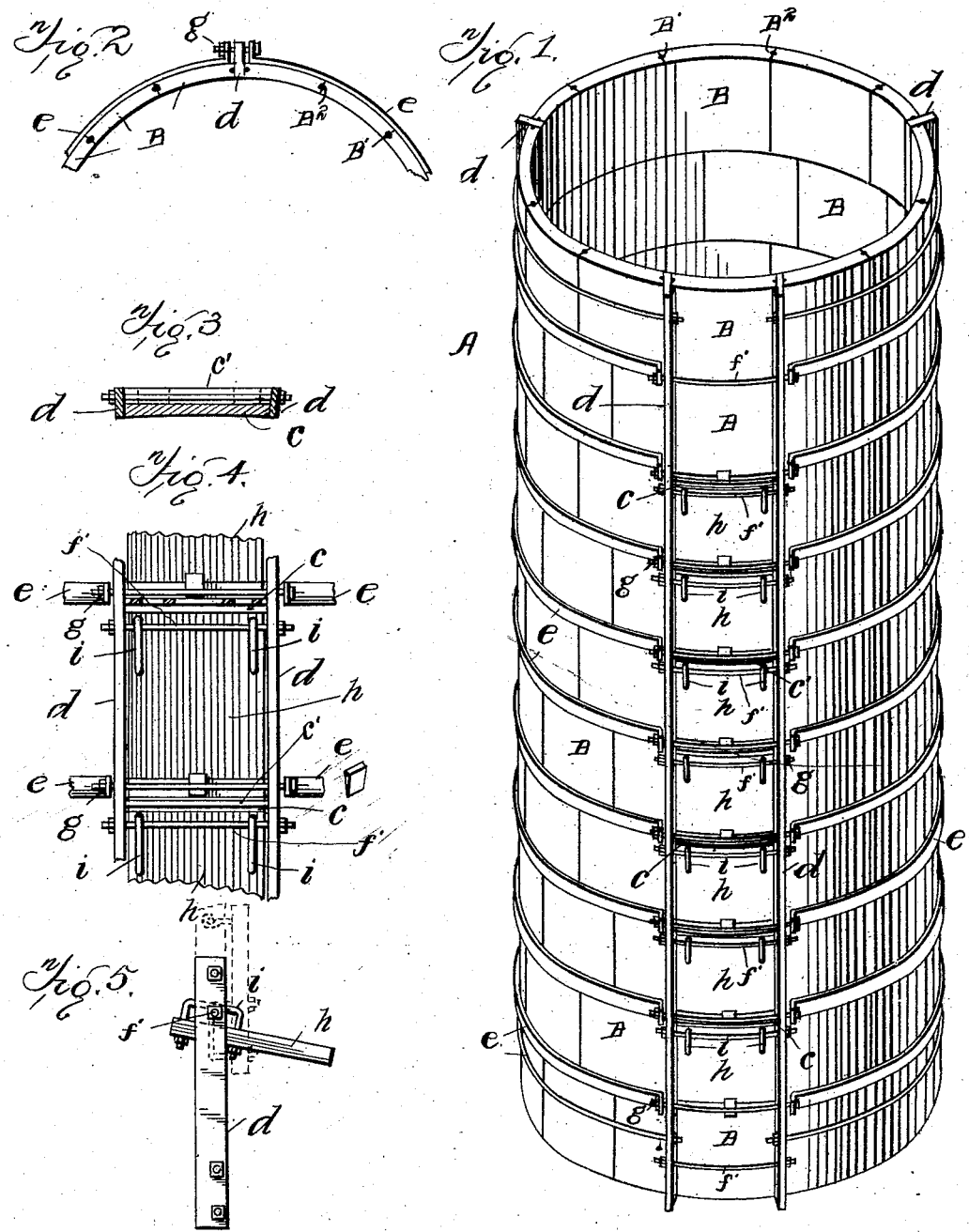

JOHN WELLS WOODRUFF, OF HAMBURG, NEW YORK.

SILO.

SPECIFICATION forming part of Letters Patent No. 699,997, dated May 13, 1902.

Application filed November 30, 1901. Serial No. 84,240. (No model.)

*To all whom it may concern:*

Be it known that I, JOHN WELLS WOODRUFF, a citizen of the United States, residing at Hamburg, in the county of Erie and State of New York, have invented certain new and useful Improvements in Silos; and I do declare the following to be a full, clear, and exact description of the invention, such as will enable others skilled in the art to which it appertains to make and use the same, reference being had to the accompanying drawings, and to the letters of reference marked thereon, which form a part of this specification.

The objects of the invention are to furnish a fireproof silo or tank that will be simple and economical in construction and easily operated and one that will not decay by the action of the juices and acid in the silage or contents.

To this end the invention consists in the novel construction and combination of the several parts composing the silo or tank, as will be hereinafter more in detail described, and particularly pointed out in the claims.

In the accompanying drawings, to which reference is had and which fully illustrate my invention, Figure 1 is a front view of a modified form of the silo, and Figs. 2, 3, 4, and 5 are details thereof.

Referring to the drawings by letter, A designates the silo, which is of cylindrical form and composed of a series of various-sized concave brick or tile pieces B, made of any suitable clay or rock substance properly burned, and iron coupling-standards $d$ $d$ $d$, which form a part of the silo and are used therewith, all of said parts being united together by means of cement run into grooves $B'$ $B^2$, formed in the tile pieces B, (clearly shown in the drawings,) and a series of bent rods or bands $e$, disposed at proper intervals apart, the top and bottom hoops or bands being round and having nuts on their ends by which they are adjustably secured to the standards and by means of which the hoops can be tightened and loosened at will around the silo, encircling the silo its full height and secured to the standard $d$ $d$ $d$. These bands or hoops in surrounding the silo cover the joints between each layer of the tiles.

$h$ designates a series of concave doors located and arranged one above the other in the silo and secured or hinged, as at $f'$ $i$, to the coupling-standard $d$ and opening outwardly from the silo, one of which doors is detached from the silo, as shown in Fig. 5 of the drawings.

A narrow opening is formed in the silo, extending its full height, except where narrow cross-pieces $c$ $c$ $c$ (clearly shown detached from the silo in Fig. 3) are put in to separate the doors and keep the standards and ways proper distance apart and make the structure firm, and along the sides of this opening are provided the ways $d$ $d$, within which is a series of doors arranged one above the other, as will be hereinafter explained.

$e$ designates metallic bent rods or bands for hoops arranged in series around the silo or tank from the top to the bottom, which are passed from one coupling-standard to another, securing each section of the several sections separately, their free ends being secured by bolts passing through the bands and standards or ways, provided with nuts $g$ $g$, by which the sections of hoops or bands around the silo are tightened up as occasion requires.

$h$ designates a series of swinging doors snugly fitted in the narrow opening which extends from the top to the bottom of the silo between coupling-standards $d$ $d$, each door of the series being down or closed, as shown in Fig. 1. These swinging doors $h$ are provided with a staple $i$ on each side, which hangs over one of the binding curved rods $f'$, and which are opened by pulling out the bottom and raising it up, the staples $i$ acting as hinges. The door is held up by letting it slide through under cross-piece $c$, or it may be thrown clear up and held there by hooking it to a bracing-rod above. When closed, they are held tight by a wedge-shaped piece dropped between the door and the curved rods $f'$. (More clearly shown in Figs. 4 and 5 of the drawings.)

By the construction of my silo as hereinbefore described important advantages are attached thereto over such silos of the ordinary construction heretofore used, one of the essential advantages of which is the carbonic-acid gas, such being retained therein for the proper preservation of the silage, the silo being constructed of tiles of clay and rocky substances and cemented and bound together by hoops or bands from top to bottom. There is no possibility of the gas escaping, so that when it is filled with material the nuts can be loosened or tightened to suit the conditions of the weather and its action upon the silo. The wooden silo is a short-lived structure on account of the carbonic-acid gas consuming the fibers of the wood, which allows the grains of the wood to separate. Consequently it becomes porous and loses its virtue as a fodder-preservative, besides, in a few years the structure becomes entirely worthless in consequence of rot and decay. Thus the carbonic-acid gas which arises from the fermentation of the contents of the silo when being converted into silage is retained. This being heavier than the air the contents must be removed from the top.

In building the silo the coupling-standards are set up at equal distances apart, so as to divide the circumference of the silo into three or more parts, and sectional rods are passed through each standard and form practically a continuous hoop entirely around the silo, thus admitting of drawing the silo snugger than though a single hoop went entirely around, and inasmuch as the coupling-standards are set up and become a part of the silo it makes it much stiffer and stronger. They keep the hoops in their proper places, both horizontally and perpendicularly, and also as a post or door-frame in the door-section they can be made of any desirable material to correspond with the size used in the body of the silo.

The swinging and sliding doors open outwardly, so that when the contents have been used down to the bottom of these doors the opening is changed to the next door below, removing the wedges which loosen the doors in the ways or standards and then tightening them when closed by replacing the wedges. As the contents are used the openings are changed by pulling out the bottom and sliding the door on the staple when the silo is entirely emptied. The silo as constructed is absolutely air-tight and is substantially made, and the hoops can be adjusted to all conditions of the silo or its contents.

Having thus described my invention, what I claim as new, and desire to secure by Letters Patent, is—

1. In a device of the class described coupling-standards, segmental tiles having grooved edges between the standards, a cement filling in said grooves, and tightening-bands connecting the standards.

2. In a device of the class described, coupling-standards, tightening-bands connecting the standards, an opening between two contiguous standards, a door for closing said opening having staples through which a tightening-band passes whereby the door may be swung outwardly and then slid inwardly to a position in which it bears upon one of the edges of the opening to maintain it in open position.

3. In a device of the class described coupling-standards, courses of segmental filling-pieces between the standards tightening-bands between the standards located over the joints between the courses of filling-pieces and means for tightening the bands.

In testimony whereof I affix my signature in presence of two witnesses.

JOHN WELLS WOODRUFF.

Witnesses:
   WM. H. BATES,
   WM. H. DE LACY.